Sept. 13, 1927.
L. S. BURGETT
CABLE SPLICING
Filed Feb. 28, 1925
1,642,484
2 Sheets-Sheet 1
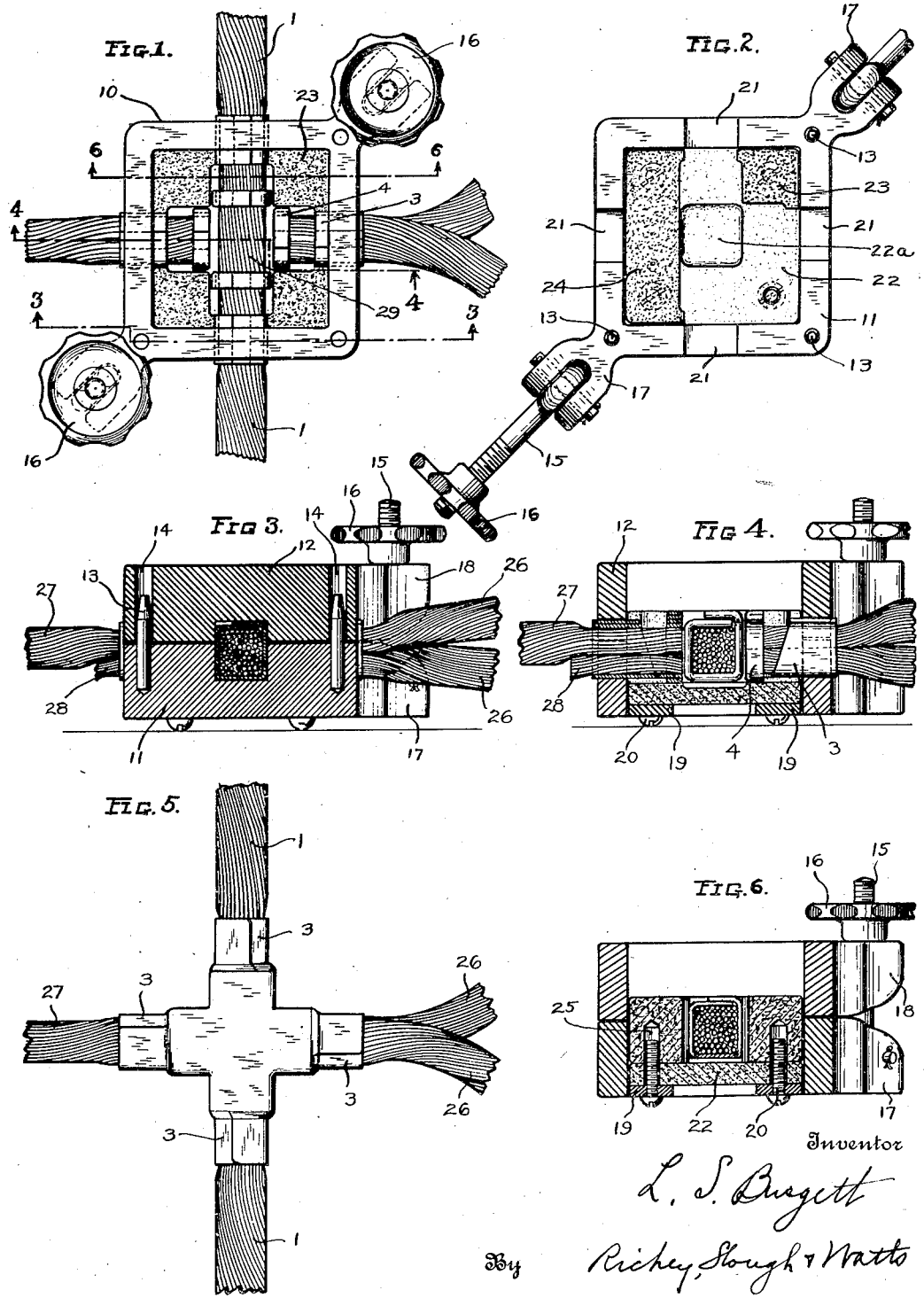

Sept. 13, 1927.  L. S. BURGETT  1,642,484
CABLE SPLICING
Filed Feb. 28, 1925   2 Sheets-Sheet 2
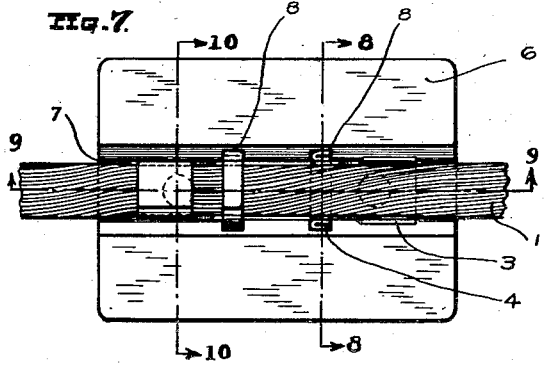
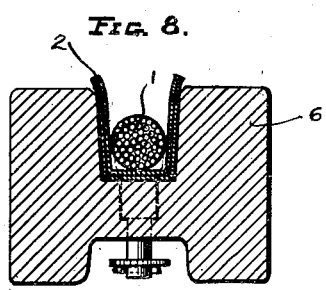
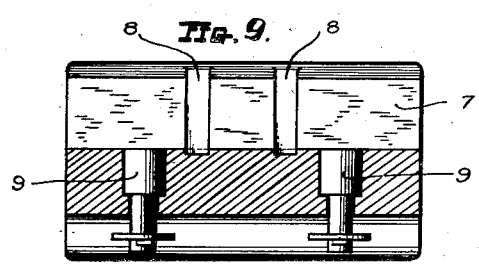
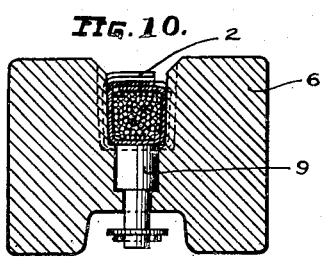
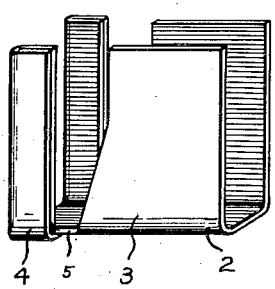
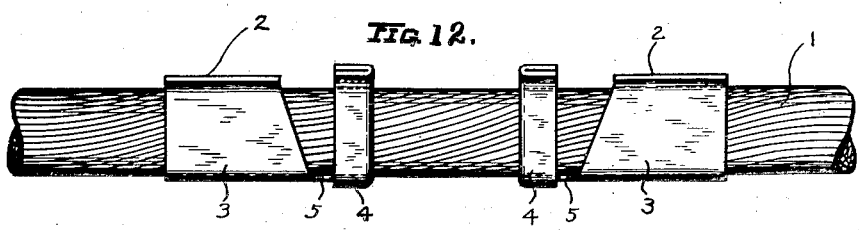
Inventor
L. S. Burgett
By Richey, Slough & Watts
Attorney Patented Sept. 13, 1927.

1,642,484

UNITED STATES PATENT OFFICE.

LYNN S. BURGETT, OF CLEVELAND, OHIO, ASSIGNOR TO THE RAIL WELDING & BONDING COMPANY, OF CLEVELAND, OHIO, A CORPORATION OF DELAWARE.

CABLE SPLICING.

Application filed February 28, 1925. Serial No. 12,215.

My invention relates to the art of welding metals, more particularly to the art of cable-splicing.

In the bonding of street railway rails, especially in bonding around crossings or special-work, it is frequently desired to splice electrically conductive cables such as stranded copper cables so as to form a joint of low electrical resistance between the cables. It is usually desired to splice such cables while in place, and hence a method of splicing involving portability of apparatus is desirable. Furthermore, it is frequently desired to splice in one joint the ends of more than two cables, such as three or four, or to splice several cable ends to another cable, and frequently the cables are of various sizes, usually below 500,000 circular mils in capacity. Very often, as the result of a previous insulating operation, the individual strands of the cables to be spliced and the cables in their entirety are covered with tar or similar cable-insulating materials. The insulating material covering the outside of the cable may be fairly readily removed, but when the individual strands of such conductive cable are surrounded by tarry or other cable-insulating or similar substances, it becomes very difficult to weld to all or any of such strands, and consequently very difficult to obtain a satisfactory cable-splice.

An object of my invention is to provide a method of and apparatus for integrally uniting a plurality of electrically conductive cables which may be of the same size or of various sizes.

Another object of the invention is to provide a method of integrally uniting in a single operation a plurality of electrically conductive stranded cables the individual strands of which may be more or less covered with tar, cable-insulating materials, or similar substances.

A further object of my invention is to provide a portable cable-splicing mold adapted to splice various numbers and sizes of cables, and in which mold the cables and the weld are visible to the operator at all times.

Another object of this invention is to provide a metal clip for use in splicing clean cables or cables containing consirable amounts of tar, cable-insulating materials, or similar substances.

A further object of my invention is to provide a cable-splice of low electrical resistance.

Another object of the invention is to form a cable-splice which will be resistant to bending stresses.

Other objects of my invention will be obvious to one skilled in the art from the description of it hereinafter given.

Briefly, my improved process for welding or splicing cables, such as stranded cables, contemplates disposing clips of metal about the ends of the cables to be spliced together, positioning the ends of the cables in a mold and supplying heat and molten metal between the ends of the cables to be united in such manner as to substantially remove any tarry material surrounding the strands of the cable portions to be united, and as to effect thereafter, the integral uniting of the said cables.

Figure 1 is a plan view of an assembled mold embodying my invention with cables positioned therein in welding position.

Fig. 2 is a plan view of a mold assembled for forming a T-weld, the upper portion of the frame and one corner carbon portion or block being removed.

Fig. 3 is a vertical section on line 3—3 of Fig. 1.

Fig. 4 is a vertical section on line 4—4 of Fig. 1.

Fig. 5 is a plan view of the cables shown in Fig. 1 after the welding operation and showing the appearance of the completed weld.

Fig. 6 is a vertical section on line 6—6 of Fig. 1.

Fig. 7 is a plan view of a die for disposing a clip or clips about a cable preparatory to the welding operation, there being shown in the die two clips and a cable, one of the clips being disposed about said cable.

Fig. 8 is a vertical section on line 8—8 of Fig. 7.

Fig. 9 is a vertical section on line 9—9 of Fig. 7, the cable and clips being removed, showing recesses or grooves in the die for disposing a clip or clips about a cable and for providing a spaced relation between two clips, and means for ejecting the cable after a clip or clips have been disposed thereabout.

Fig. 10 is a vertical section on line 10—10 of Fig. 7.

Fig. 11 is a perspective view of a form of clip embodied in my invention.

Fig. 12 is a vertical elevation showing two clips disposed about a cable in spaced relation to each other.

In the accompanying drawings, 1 indicates a stranded cable, such as of copper. The cable 1 may be relatively clean on its exterior, any tarry or other insulating material having been previously removed therefrom, and the individual strands of said cables may be clean, or may be covered with tar or other insulating or similar substances.

According to my invention I dispose about each portion of cable which is to form a part of the splice a clip 2, which is preferably of the same material as the cable, such as copper, and which consists preferably of spaced cable-encircling portions 3 and 4 which may be joined or connected by a strip of metal 5. The clip 2 may be formed of sheet copper and where thin sheet copper is employed, the metal forming the cable-encircling portion 4 may preferably be doubled back on itself so as to make said portion 4 sufficiently heavy in section for chilling purposes, as will be described hereinafter. Before disposing the clip 2 about the cable 1 the said clip 2 is preferably formed into a U as illustrated in Fig. 11, the base of which U is substantially flat.

A clip 2 is by preference disposed about a cable 1 by means of a clipping form or die 6, which may be of cast iron, or similar material. Within the die 6 there may be a longitudinal groove 7 and transverse grooves 8 of such size that a clip 2 formed into U-shape may be readily positioned therein, the clip portion 4 fitting into one of the transverse grooves 8. In the drawings I have shown a die having two transverse grooves 8 disposed within the groove 7, thus providing for the application to a cable of two clips 2 in spaced relation. Ejector pins 9 may be located beneath the groove 7 for the purpose of facilitating the removal of cable after the disposition of a clip or clips 2 thereabout.

One or more U-shaped clips 2 may be disposed about a cable 1 by placing the said clips in the groove 7 of the die in such manner that the portions 4 fit into the transverse grooves 8 and so that the portions 4 face each other. The cable 1 may then be disposed within the groove 7 and within the clip or clips 8 as indicated in Fig. 8 and in the right hand half of Fig. 7. With a suitable means such as a piece of flat steel the portion of the cable 1 within a clip 2 may be somewhat flattened to conform substantially to the shape of the clip 2. The portions 3 and 4 may then be bent over the flattened cable portion so as to form a substantially rectangular section as indicated in Fig. 10 and in the left half of Fig. 7, and in Fig. 12. When the clip or clips have been applied to the cable as above indicated the said clips 2 and the cable 1 enclosed therein may be loosened from the die by tapping ejector pins 9. In Fig. 12 is shown in assembled relation cable 1 with two clips 2 disposed thereabout. Preferably when the clip 2 is disposed about a cable 1, the vertical edges of the portion 3 facing portion 4 form an acute angle with the plane of the bottom of the cable, which angular condition provides for greater ease in welding, as will be hereinafter described.

I prefer to carry out the splicing or welding operation in a mold such as indicated in its entirety as 10. The mold 10 may comprise lower and upper frame portions 11 and 12 respectively, which portions are preferably composed of copper, and which may be square in section, or of any other suitable shape. The frame portions 11 and 12 may be positioned in assembled relation by any suitable means, such as by pins 13 and holes 14 in the portions 11 and 12 respectively, and may be maintained in such assembled relation by means of the eyebolts 15 and nuts 16. The eyebolts 15 may be pivotally affixed to outwardly extending portions 17 of the lower frame portion 11, and the nuts 16 may be adapted to co-operate with outwardly extending portions 18 on the upper frame portion 12. As a suitable supporting means for interior portions of the mold there may be affixed strips 19 of metal such as copper to the bottom of the lower frame portion 11 and extending across the bottom thereof. Pins or screws 20 may pass through the strips 19 and extend thereabove. In the sides of the frame portions 11 and 12 are openings 21 for the purpose of admitting the cable ends to be spliced, and which openings are preferably rectangular in shape and which may be formed in either of the frame portions 11 or 12 or in both. In the construction shown, the openings 21 are formed partially in each of the upper and lower frame portions. The width and height of the openings 21 are preferably such as to admit a cable 1 with a clip portion 3 disposed thereabout.

A suitable refractory portion or portions may be disposed within the frame to form a mold cavity. Thus, within the frame portions may be disposed a mold base 22 preferably composed of a refractory material such as carbon, and refractory blocks 23 such as of carbon adapted to serve as walls of a mold cavity. A depression 22$^a$ may be formed in the center of the base portion 22, and the top of the base portion 22 may be slightly lower than the plane of the bottom of the openings 21. Where it is desired to splice fewer cable ends than those provided for by the number of openings 21 in the frame, the mold cavity may be altered to suit the number of cable ends to be spliced. Thus, two blocks 23 may be replaced by a side block 24. Blocks 23 and 24 may be maintained in position by means of holes 25 therein which co-operate with screws or pins 20 extending upwardly through the base 21 and thereabove. The sides of the blocks 23 and 24 facing the interior of the mold are preferably slightly cut away to within a short distance of the inner wall of the frame, and the openings 21 and the portions of the blocks 23 or 24 adjacent thereto are preferably substantially in alignment.

Cables positioned within the mold 10 ready for the splicing or welding operation are shown in Fig. 1. Preferably the clip portions 3 contact substantially with the perimeter of the openings 21, and the heavy clip portions 4 preferably contact with base carbon 22 and the cut-away parts of the blocks 23 or 24. It will be noted that I may prefer to enclose within a clip 2 a plurality of cable portions 26 smaller than cable 1, or a cable portion 27 together with an additional short cable portion 28, for the purpose of increasing the cable area within the clip 2. It will thus be seen that my improved mold is universal in its application, in that I may weld or splice together various numbers of cables, and cables of various sizes.

In carrying out the splicing or welding process, I preferably employ a source of heat such as a gas flame, or the carbon arc, with which carbon arc I may employ a current of about 250 amperes.

When using the carbon arc process with a source of direct current supply, I prefer to connect a positive terminal of said current supply to the mold or to the cables or carbons therein. Since the cables, carbon, and mold are all in electrical contact with each other it is immaterial to which of these the terminal is connected. This terminal may be connected to a ground block (not shown) and this block may be contacted with any part of the mold or the mold may be disposed upon any suitable surface such as a bar of steel and said terminal connected with the steel. The electrical circuit is completed by bringing a carbon electrode connected with the negative terminal of the current supply, into contact with the cable or adjacent carbons. The carbon is then withdrawn a suitable distance, such as three-sixteenths of an inch, to form the electric arc. The cables may then be melted by maintaining said arc adjacent thereto. Additional metal may be introduced into the mold cavity from above and may be melted in a manner similar to the cable ends. It will be understood that either direct or alternating current may be employed and that either a carbon or metal electrode may be used in conjunction therewith. With direct current and the carbon arc process I preferably employ as a source of current a dynamotor, motor generator, or resistance welder. Where a gas flame is employed for melting, an acetylene torch may be used and the flame impinged upon the cables and metal to be melted. Where the gas flame is used no electric circuit is necessary. When splicing clean cable I may employ a metal arc as a source of heat. I preferably maintain the source of heat such as the carbon arc within the area 29 enclosed by the heavy clip portions 4 until all cable enclosed within this area is melted down and until any tar or similar material within this area is substantially burned out or volatilized. Any remaining tar or similar material may be retained within the depression 22ª in the base carbon 22. I then prefer to add slowly molten copper, such as from a copper rod, and to maintain the carbon arc on the copper so as to maintain it in a molten state and so as to permit the molten copper to come in substantial contact with the ends of all the exposed strands.

The addition of molten copper is continued until the space within the area 29 is substantially filled therewith. It will be noted that during the slow addition of molten metal to the space within the area 29, the individual strands exposed to the molten copper become heated and any tar or similar material may be volatilized or burned therefrom, and the products of the volatilization or combustion may readily escape into the atmosphere through the portions of cable exposed between the clip portions 3 and 4. In this manner, any tar or similar material is removed from cable portions adjacent to the clips 2. The operator may note the presence of any remaining tarry material by observing cable between the clap portions 3 and 4. It will be noted that during this time the clip portions 4 and the cable portions enclosed therein are not melted down due to the chilling effect of the copper clip portion 4, and due also to the fact that the source of heat is not maintained directly thereon. It will thus be seen that the clip portions 4 and the cable enclosed therein act as a dam, preventing molten metal from passing by but permitting heat for burning out any volatile matter from the adjacent cable portions to be transmitted therethrough.

The said cable between clip portions 3 and 4 and clip portions 4, as well as the inner parts of clip portions 3, may now be melted down by means of the carbon arc. It will be noted that the melting down of the cable immediately adjacent to the clip portions 3 is facilitated by the construction of the said portion 3 whereby the vertical edges of the portion 3 facing portion 4, form an acute angle with the plane of the bottom of the cable.

Additional molten copper may now be added to substantially fill the mold cavity, after the cooling of which the finished splice may be removed from the mold. It will be understood that I may employ a welding rod of pure copper, although I may prefer to employ a copper rod having alloyed therewith a small proportion of a deoxidizing agent such as silicon, or I may employ a copper welding rod having alloyed therewith or coated thereon any suitable fluxing or alloying agent or agents.

It is evident that while I have described my invention as relating particularly to the splicing of copper cables, it may be applied equally well to the splicing of cables of other alloys, such as copper or other suitable ferrous and non-ferrous alloys. It will also be evident that my process is equally applicable to the splicing of clean cable to clean cable, and of clean cable to stranded cable soaked with tar or similar materials. It will also be seen that I may employ a clip composed of entirely separate portions instead of having such portions connected as by a narrow strip of metal. Furthermore, where clean cable only is to be spliced I may employ a plain sheet metal clip or a clip corresponding to the section 3 described in the specification. One advantage of my improved clip as described in the specification is that I am enabled to employ thin sheet copper for the clip thus saving copper and providing for the easier application of the clip, particularly of the section 3, due to the greater ease of bending a thin piece of copper, and the smaller tendency of such thin sheet copper to crack during bending.

It will be seen that my improved mold is advantageous by reason of its portability, and because the welding operation is visible at all times to the operator. Furthermore, the use of interchangeable, simple, mechanically strong portions of carbon provide for long life, low cost and ease of maintenance. It will be seen that by providing rectangular holes or openings in the mold I may readily splice various sizes of cables, it being a simple operation to form said cable and a clip thereabout in the desired size to fit the opening in the mold so as to provide the requisite damming action. It will be understood, of course, that I may design my mold to have a capacity of various maximum numbers and various maximum sizes of cable.

It will further be noted that I obtain by my improved process, a splice of high electrical conductivity and high mechanical strength due to the fact that any bending stresses in the cables do not take place immediately adjacent to the junction of the strands and copper casting but rather at the outer ends of the clips where the cables are more resistant to such stresses.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. The method of integrally uniting a stranded cable having tarry or similar material disposed about the individual strands thereof to one or more additional stranded cables, which method comprises disposing said cables with portions thereof extending into the open-top mold cavity of a mold, heating the cable portions within said mold cavity for a time sufficient to volatilize and remove tarry or similar material therefrom, melting portions of the cables within said mold cavity, and melting therewith additional metal to form a casting integrally united to each of said cables.

2. The method of integrally uniting a stranded cable to one or more additional stranded cables which comprises disposing said cables with portions thereof extending in a substantially horizontal manner into the open-top mold cavity of a mold, melting cable portions in said mold cavity, melting additional metal in said mold cavity whereby to form a casting integrally united to each of said cables, and simultaneously chilling the portions of said cables adjacent the exterior of said mold cavity whereby to prevent leakage of molten metal out of said mold cavity and to prevent the melting of cable portions disposed exteriorly of said mold cavity.

3. The method of uniting a stranded cable having tarry or similar material disposed about the individual strands thereof to one or more additional stranded cables which comprises disposing said cables with portions thereof extending into the open-top cavity of a mold to positions adjacent each other, melting increments of metal in substantial contact with the most closely adjacent portions of said cables, confining said molten metal to said closely adjacent portions whereby to highly heat the adjacent strands of tarry cable, volatilizing and removing tarry or similar material from adjacent cable by said heat, melting additional metal of the cable portions extending into said mold cavity, and melting additional metal therewith, whereby to form a casting integrally united to each of said cables throughout their cross-sections.

4. An open top mold for cable-splicing, comprising a frame having removable refractory members forming a mold cavity adapted to receive the ends of the cables to be spliced, and apertures in the frame for introducing the ends of the said cables into the said mold cavity.

5. An open top mold for cable-splicing, comprising a copper frame, mold cavity forming portions of refractory material, and apertures in the frame for introducing the cable to be spliced into the mold cavity.

6. A mold for cable-splicing comprising a two part copper frame, apertures within the copper frame for introducing the cables to be spliced into the mold and a mold portion within the copper frame comprising carbon portions for forming the bottom and sides of the mold cavity.

7. A mold for cable-splicing, comprising a two-part copper frame, and mold cavity forming portions of refractory material disposed within the frame, co-operative apertures formed in the parts of said frame for introducing the cables to be spliced into the mold cavity, and means carried by the cables to substantially fill said apertures to prevent leakage of molten metal from the mold cavity.

8. A mold for cable-splicing comprising a copper frame of two superimposable co-operating portions, cable-receiving apertures in said frame portions, supporting means in the lower frame portion, a removable carbon mold-cavity base on said supporting means, and removable carbon mold-cavity walls supported on said carbon base and within the frame portions, said carbon base and walls forming an open top mold cavity within which the portions of cables to be spliced may be disposed.

9. A mold for cable-splicing comprising a rectangular copper frame consisting of two co-operating parts one superimposable upon the other, metal strips across the bottom of the frame for supporting the carbon bottom of the mold cavity, a rectangular aperture in each side of the copper frame the bottoms of all of said apertures lying in the same horizontal plane said apertures being formed partially in the lower and partially in the upper portion of said frame, a carbon plate within said frame and supported upon said metal strips to form the bottom of the mold cavity, a centrially disposed recess in said carbon plate to receive any excess tarry material, and removable carbon blocks on said carbon plate within said frame, said carbon blocks forming the sides of the mold cavity within the mold.

10. The method of integrally uniting a stranded cable to one or more additional stranded cables, which comprises disposing said cables with portions thereof extending in a substantially horizontal manner into the open-top mold cavity of a mold, melting portions of the cable within said mold cavity, melting additional metal having associated therewith silicon in said mold cavity whereby to form a casting integrally united to each of said cables, and simultaneously chilling the portions of said cables adjacent the exterior of said mold cavity whereby to prevent leakage of molten metal out of said mold cavity and to prevent the melting of the cable portions disposed exteriorly of said mold cavity.

11. The method of integrally uniting a stranded cable to one or more additional stranded cables, which comprises disposing said cables with portions thereof extending in a substantially horizontal manner into the open-top mold cavity of a mold, melting cable portions in said mold cavity, melting in said mold cavity additional metal having associated therewith a de-oxidizing agent whereby to form a casting integrally united to each of said cables, and simultaneously chilling the portions of said cables adjacent the exterior of said mold cavity whereby to prevent leakage of molten metal out of said mold cavity and to prevent the melting of the cable portions disposed exteriorly of said mold cavity.

In testimony whereof I hereunto affix my signature this 25 day of February, 1925.

LYNN S. BURGETT.